(12) United States Patent
Tuan et al.

(10) Patent No.: US 9,797,492 B2
(45) Date of Patent: Oct. 24, 2017

(54) FORCE CONVERTER APPARATUS AND METHOD

(71) Applicant: L.T. Machine & Tools Inc., Mississauga (CA)

(72) Inventors: Vinh Le Tuan, Mississauga (CA); Thanh Vo Van, Ho Chi Minh (VN)

(73) Assignee: L. T. Machine & Tools Inc, Mississauga, Ontario ( * ) Notice: Subject to any disclaimer, the term of this patent is extended or adjusted under 35 U.S.C. 154(b) by 336 days.

(21) Appl. No.: 14/421,693

(22) PCT Filed: Aug. 13, 2013

(86) PCT No.: PCT/CA2013/000707
§ 371 (c)(1),
(2) Date: Feb. 13, 2015

(87) PCT Pub. No.: WO2014/026269
PCT Pub. Date: Feb. 20, 2014

(65) Prior Publication Data
US 2015/0219192 A1    Aug. 6, 2015

(30) Foreign Application Priority Data

Aug. 14, 2012  (CA) .................................. 2786721
May 17, 2013   (CA) .................................. 2816624

(51) Int. Cl.
*F16H 35/18*  (2006.01)
*F03G 7/10*  (2006.01)

(52) U.S. Cl.
CPC .............. *F16H 35/18* (2013.01); *F03G 7/10* (2013.01); *Y10S 74/09* (2013.01); *Y10T 74/17* (2015.01)

(58) Field of Classification Search
CPC .................................. F16H 45/18; F03G 7/10
See application file for complete search history.

(56) References Cited

U.S. PATENT DOCUMENTS

| | | | | |
|---|---|---|---|---|
| 3,555,915 A | * | 1/1971 | Young, Jr. ................. | F03G 3/00 74/84 S |
| 3,897,692 A | * | 8/1975 | Lehberger .............. | B60K 17/00 74/84 R |
| 6,694,844 B2 | * | 2/2004 | Love ......................... | F03G 3/00 74/574.2 |
| 2010/0201133 A1 | * | 8/2010 | Mesler ................. | H02N 11/008 290/1 C |

FOREIGN PATENT DOCUMENTS

| | | |
|---|---|---|
| CA | 2207332 A1 | 12/1998 |
| DE | 3510577 A1 | 10/1986 |
| DE | 4136366 A1 | 3/1992 |

OTHER PUBLICATIONS

Written Opinion issued in PCT/CA2013/000707, dated Nov. 25, 2013.

(Continued)

*Primary Examiner* — David M Fenstermacher

(57) ABSTRACT

This invention relates to devices for converting a small input force to a larger output force and particularly relates to devices and methods for converting an input force to an output force comprising: an arm rotatable about an axis of rotation where the axis of rotation is moveable between first and second positions; an input force for rotating and moving the arm about the axis of rotation between the first and second positions; structure for controlling the rotation of the arm, movement and position of the axis of rotation to generate a non-circular orbital segment of the arm to transfer an output force between the first and second positions.

20 Claims, 11 Drawing Sheets

(56) References Cited

OTHER PUBLICATIONS

"The Secret Free Energy Potential of Centrifugal Force", see "Comments" made public Jan. 10, 2012 (Jan. 10, 2012), <URL: http:pesn.com/2012/01/07/9602006_Secret_Free_Energy_Potential_of_Centrifugal_Force>.

* cited by examiner

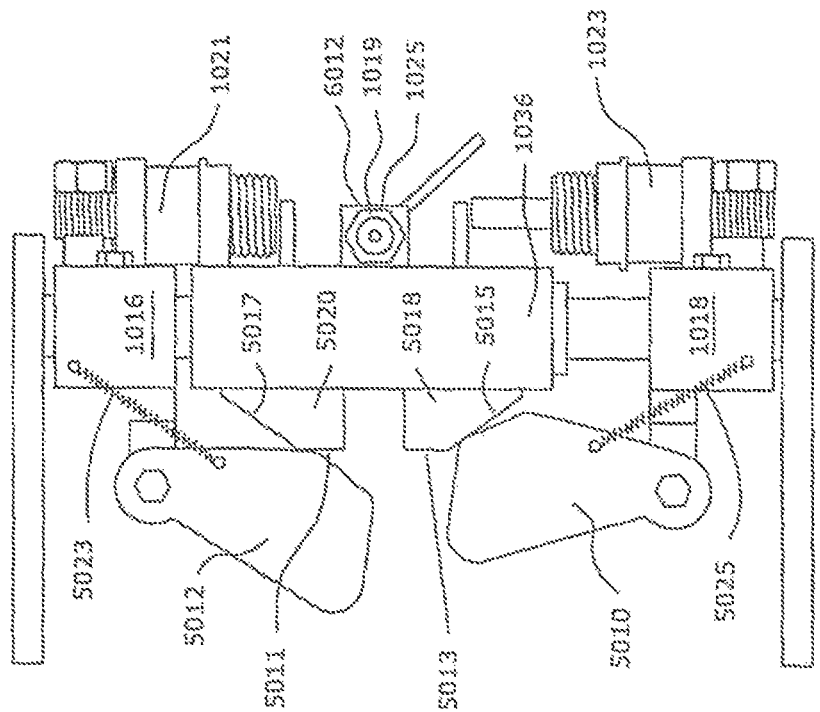
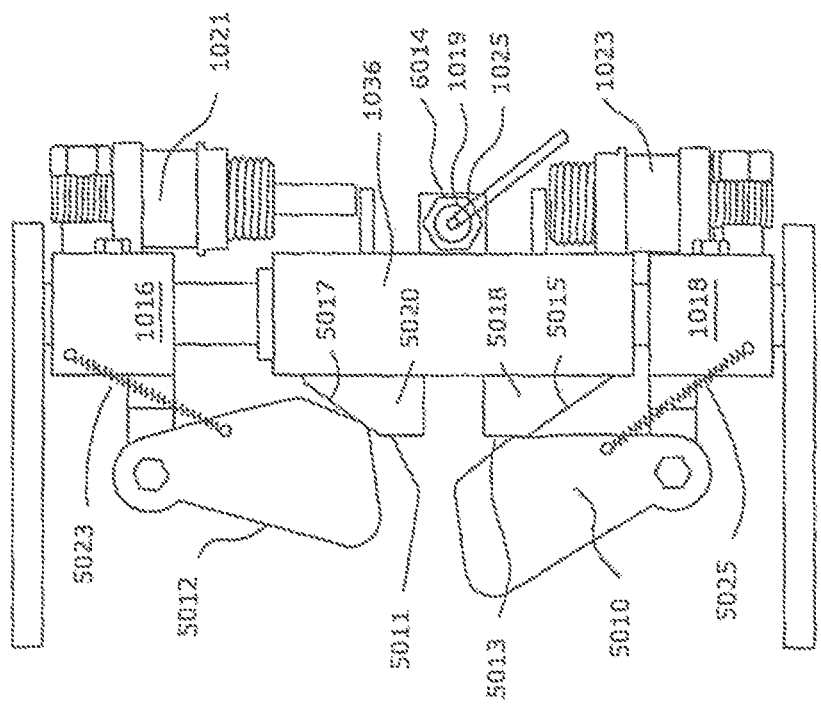

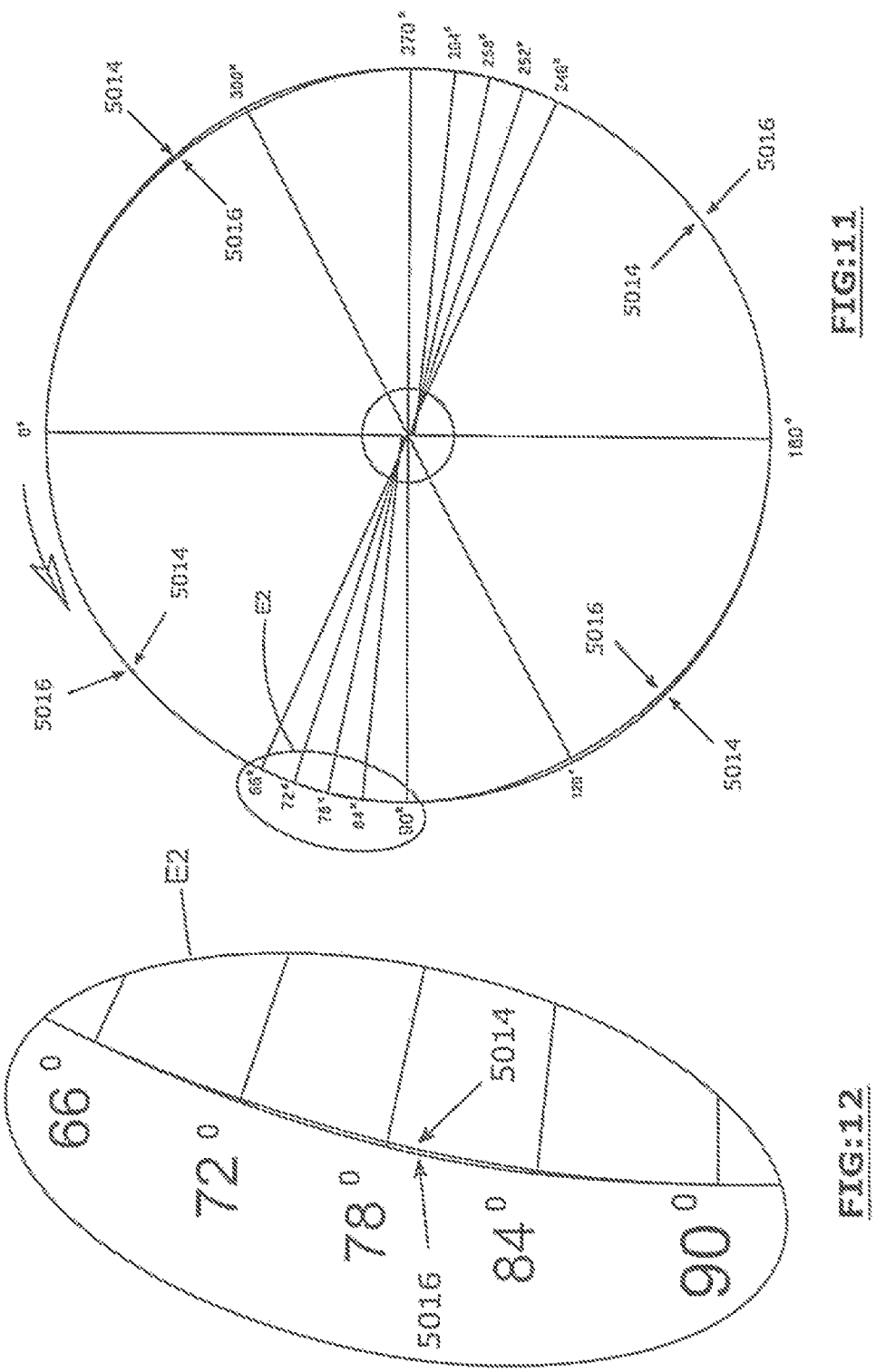

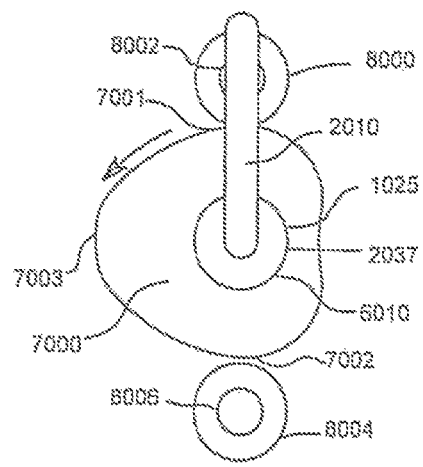
FIG: 13
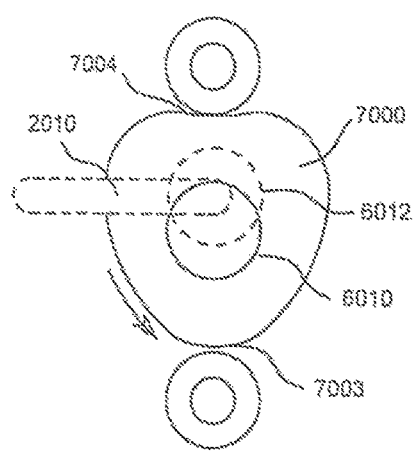
FIG: 14
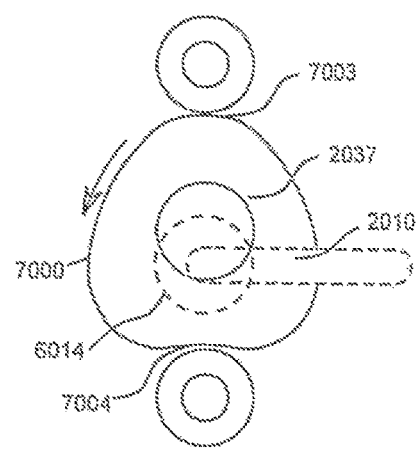
FIG: 16
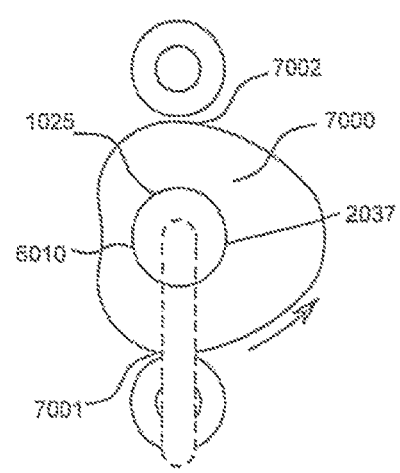
FIG: 15

FORCE CONVERTER APPARATUS AND METHOD

FIELD OF THE INVENTION

This invention relate to devices for converting a small input force or torque to a larger output force or torque while maintaining the input to output speed ratio relatively constant.

BACKGROUND OF THE INVENTION

Gearboxes are one of the most useful devices for transmitting power from a driving force to a desired output force. The output force or torque can be set at the desired operation level but the speed ratio is not the same and it is not efficient because of the high energy that is consumed and the friction loss between the transferring mechanisms, which is undesirable. In other words the output speed drops to increase the output force. The invention herein on the other hand increases the output force while maintaining a relatively constant input to output speed ratio.

There is a need for a more effective device and method for transmitting a driving force to a desired output force. One way of improving the transmission of power is to utilize centrifugal force. There have been a few devices which have utilized such force in a device. For example U.S. Pat. No. 3,589,842 teaches a mechanism for orbiting a machine in a non circular orbit, such as a sliding vane in a rotary pump, while Canadian patent 2,210,332 teaches a centrifugal force drive machine for generating a force where a control member has an operable connection between a frame and a mass having a centre of gravity where the control member constrains the mass to move between a balanced and unbalanced positions.

SUMMARY OF THE INVENTION

It is an aspect of the invention to provide a device for converting a small input force to a larger output force while maintaining a substantially constant input to output speed ratio comprising: a motor shaft rotatable about a rotation centre; an arm mounted on the motor shaft for rotation about the rotation centre, with a weight at an end of the arm to generate a centrifugal force; an input force to drive the motor shaft and rotate the arm; linear motion means to permit displacement of the rotation centre back and forth between resting positions and a centre position by the centrifugal force produced by the weight and to transfer part of the centrifugal force to an output via force transferring mechanisms during selected movement of the rotation centre from one of the resting positions to the other resting position.

It is another aspect of the invention to provide a method of converting a small input force to a larger output force while maintaining a substantially constant input to output speed ratio comprising: providing an input force for rotating an arm having one end connected to a motor shaft rotatable about a rotation centre, with a weight at another end of the arm travelling on and off the circular and non-circular orbital paths to generate a centrifugal force; moving the rotational centre of the rotating arm by the centrifugal force back and forth between a first and second resting position while passing a centre position and transfer a part of the centrifugal force to the output when the rotation centre is moved between the resting positions where the output force is larger than the input force.

A further aspect of the invention is to provide a method of converting a small input force to a larger output force while maintaining a substantially constant input to output speed ratio comprising: weight mounted on the distal end of a flexible mounting rotating arm travelling through different sections on the circular orbiting path and non-circular orbital path during a revolution to generate centrifugal force and transfer a part of the centrifugal force to an output; each section of the circular and non-circular path is variable so that some of the sections can be increased or decreased to an essential point to provide different output results; the circumference of the circular orbital path and the circumference of the non-circular orbital path are about the same; the movement of the rotating arm while travelling through different sections is synchronized and harmonized with the movement of the rotation center providing maximum efficiency while transferring part of the centrifugal force to the output.

The output in one embodiment comprises a mechanism or structure that transmits the output force to a linear or rotational force. For example the linear back and forth motion can reciprocally move a transmitting bar or rotational clutch coaxially connected to rotatable output shaft.

These and other objects and features of the invention shall now be described in relation to the following drawings

BRIEF DESCRIPTION OF FIGURES

FIG. 8 is a side view of the machine in a bottom resting position.

FIG. 9 is a side view of the machine in a top resting position.

FIG. 11 is a representative view of a circular orbiting path and non-circular orbiting path.

FIG. 12 is a partial enlarged view of FIG. 11.

FIG. 13 illustrates another embodiment of the invention utilizing a clutch in a central resting position.

FIG. 14 illustrates the clutch of FIG. 13 in a top resting position.

FIG. 15 illustrates the clutch of FIG. 13 in a central resting position.

FIG. 16 illustrates the clutch of FIG. 13 in a bottom resting position.

DETAILED DESCRIPTION OF THE INVENTION

Referring to the FIG. 1-5, the Force Converter Apparatus and Method machine 100 for converting a small input force to a larger output force while maintaining the input to output speed ratio relatively constant includes a rigid machine frame 1010. The machine frame includes a protective housing 1024 to shield against the rotating arm 2010. This protection housing 1024 ensures that the machine is safe while it is operating and it consists of an annular top surface 1011 and a depending annular wall 1013 which defines an annular space that receives the rotational arm 2010 to be described herein. A top cover (not shown) can be used above the protective housing 1024. It is safer and advisable to operate the force converter apparatus and method with the safety housing and its cover in place.

The machine frame 1010 includes two round linear motion rails 1012, 1014. These two linear motion rails are spaced apart. They are connected together by two square members 1016, 1018 to keep the motion rails rigid and substantially parallel with each other. The frame 1010 includes two plates 1020, 1022 mounted on the sides of two square members 1016, 1018. In one embodiment plates 1020, 1022 are disposed vertically to support the force converter machine 100 as the legs of the machine.

Four linear motion bearings 1026, 1028, 1030 and 1032 are assembled in two linear bearing housings 1034, 1036 (see FIG. 2), these two linear bearing housings are connected together by a platform or central plate 1015.

In one embodiment a means for rotating an arm 2010 consists of a drive motor 1017 having a shaft 1019 that rotates a rotating arm 2010. This motor 1017 is mounted at the back of the platform or central plate 1015. The motor 1017 can also be mounted away from the center of the center plate and links to the drive shaft 1019 by timing belt or chain to provide consistent rotating speed to rotate the drive shaft 1019. A drive shaft 1019 is positioned at the center 2037 of the machine 100 and above the central plate or platform 1015. A sensor activator 1039 is on the side of the shaft 1019. The sensor activator 1039 communicates with an electronic proximity sensor 1009 providing the information to the machine controller 1031 to control the motion of the rotation center or axis of rotation 1025.

Two double-stroke pneumatic cylinders 1021, 1023 are mounted on the sides of two square members 1016, 1018. The cylinder 1021 is mounted on the square member 1016 and the cylinder 1023 is mounted on the square member 1018. These cylinders are activated by a machine controller 1031 to precisely and timely control the motions and positions of the rotation center 1025. The machine controller can be any suitable electrical controller, computer, CPU or the like either wired or wireless.

Figure 1:
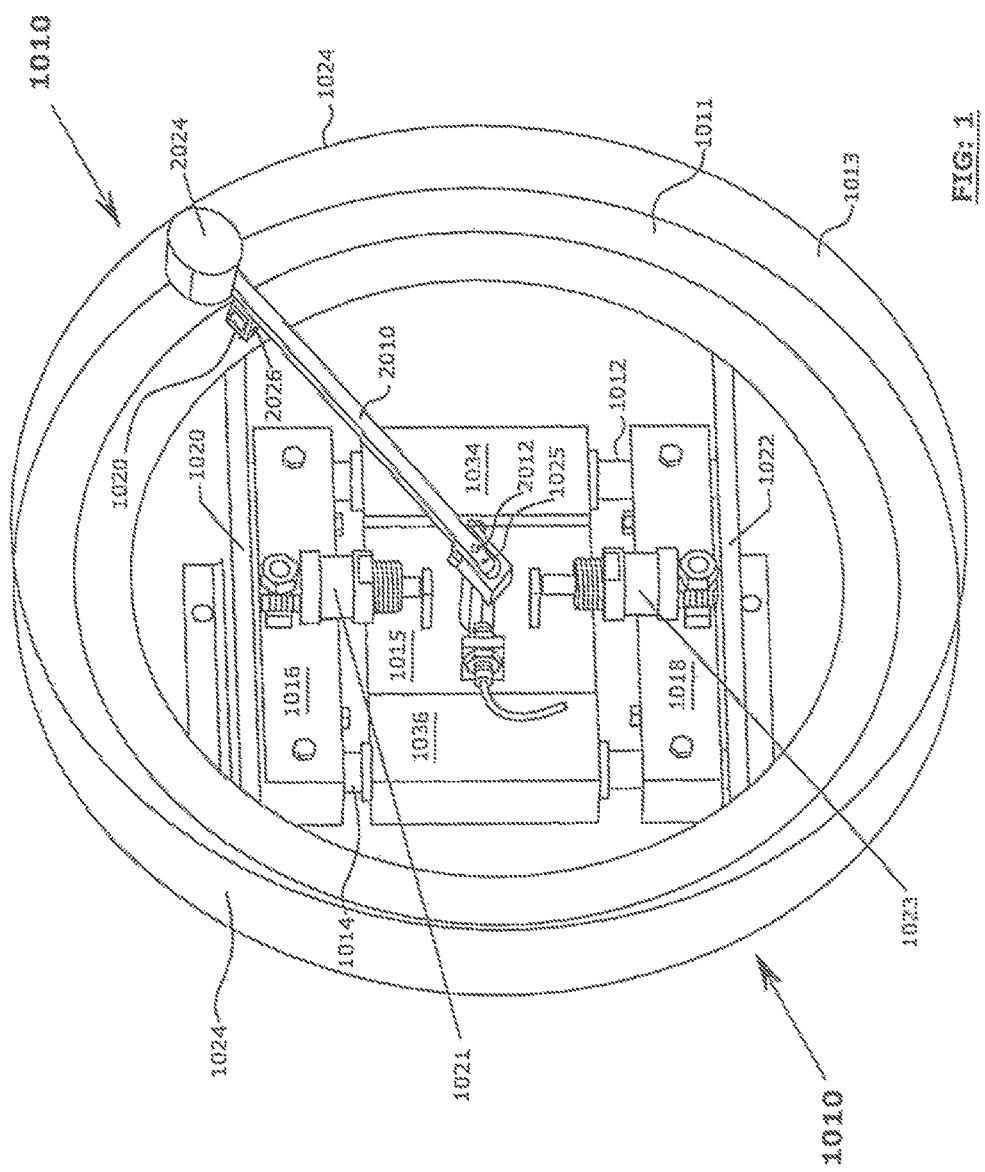
FIG. 1 is a partial perspective top view of Force Converter Apparatus and Method machine with the safety protection housing.
Figure 6:
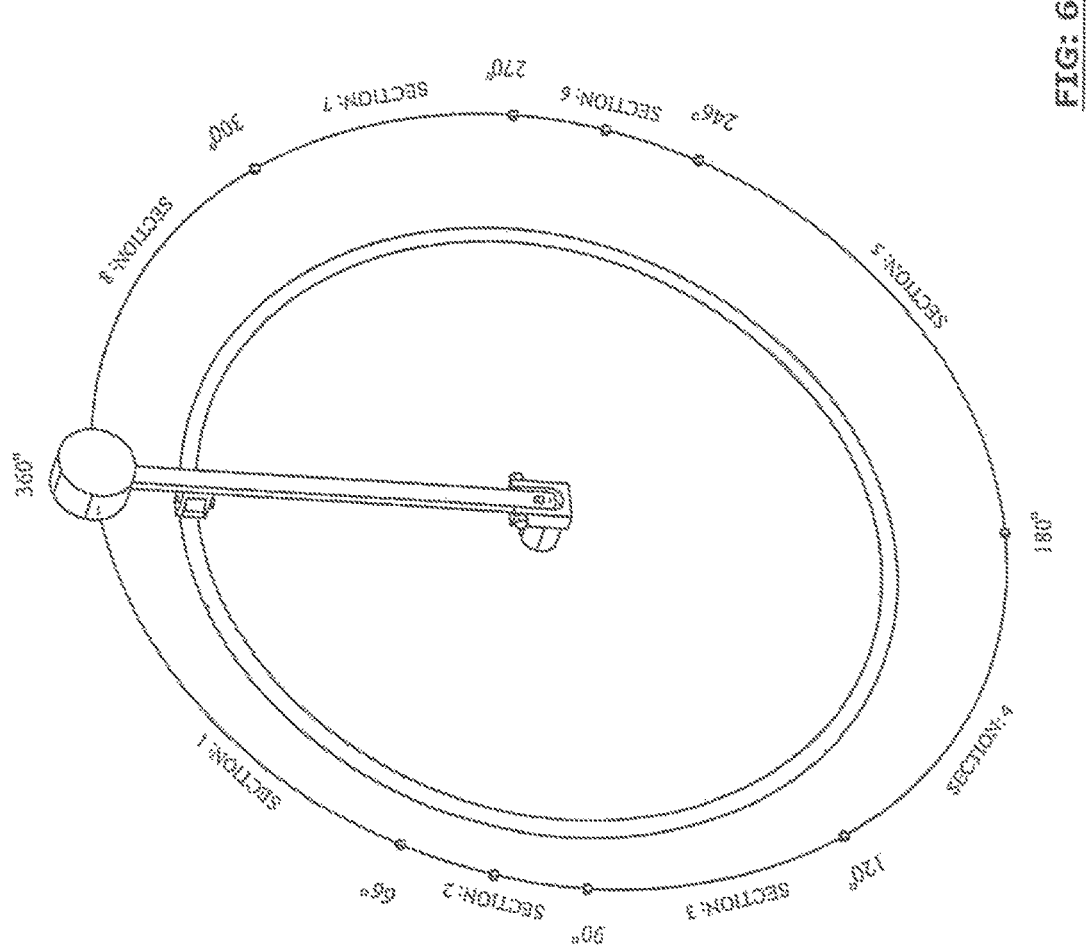
FIG. 6 is view showing the various sections of rotation.
Figure 7:
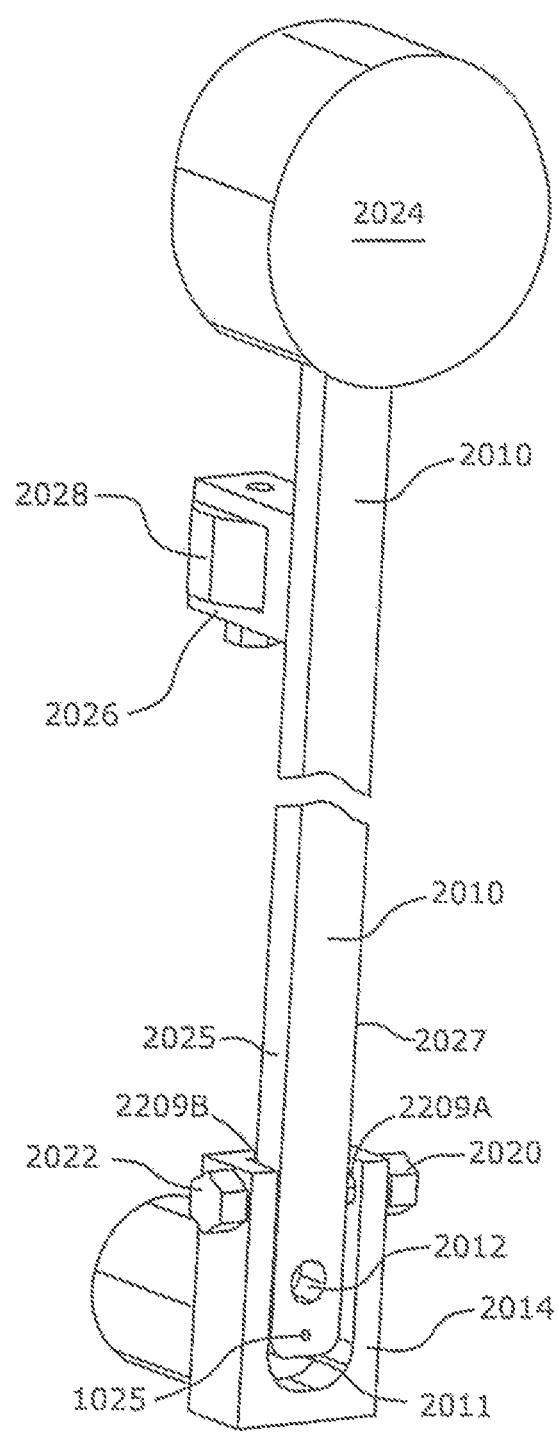
FIG. 7 is a partial perspective of the rotating arm showing the U-shaped bracket.

Referring to the FIGS. 1, 6 and 7, the force converter apparatus or device 100 and method for converting a small input force to a larger output force includes a rotating arm 2010. The proximal end 2011 of the rotating arm 2010 is mounted to a U-shaped style bracket 2014 by means of a free rotation pin 2012 or the like. In one embodiment the pin 2012 can consist of a bolt and nut to connect the arm 2010 to the U-shaped bracket 2014 so as to permit the proximal end 2011 of arm 2010 to slightly flex or move relative to the U-shaped bracket 2014 to ensure smooth operation of the machine 100. The bracket 2014 (with the arm 2010 connected to it) rotates about the axis 2017 which is coaxial with the axis of rotation 1025. The free rotation pin 2012 that connects the arm 2010 to the U-shaped bracket 2014 is offset from the rotation center 1025 (offset from the motor driving shaft 1019).

The offset distance from the rotation center 1025 to the free rotation pin 2012 provides maximum flexibility for the rotating arm 2010 to function normally and efficiency while the rotation center 1025 is being displacing backward and forward on the linear motion between resting positions. In other words the offset of the mounting pin 2012 ensures the rotating arm 2010 is functioning normally and it is not affected by such factors as the centrifugal force moving in one direction and the platform 1015 moving in another direction.

It should be noted that the mounting pin 2012 that mounts the rotating arm 2010 to the bracket 2014 can be located at the rotation centre 1025 or at the drive shaft 1019, but this reduces the flexibility of the joint and un harmony tends to creep in, especially when the weight of the rotating arm is travelling on the opposite direction with the displacement of the rotation center. Furthermore, the rotating arm 2010 can be mounted direct to the driver shaft 1019 but reduces the rotating speed of the rotating arm, lower centrifugal force and force converter will wear more quickly which is undesirable.

Figure 2:
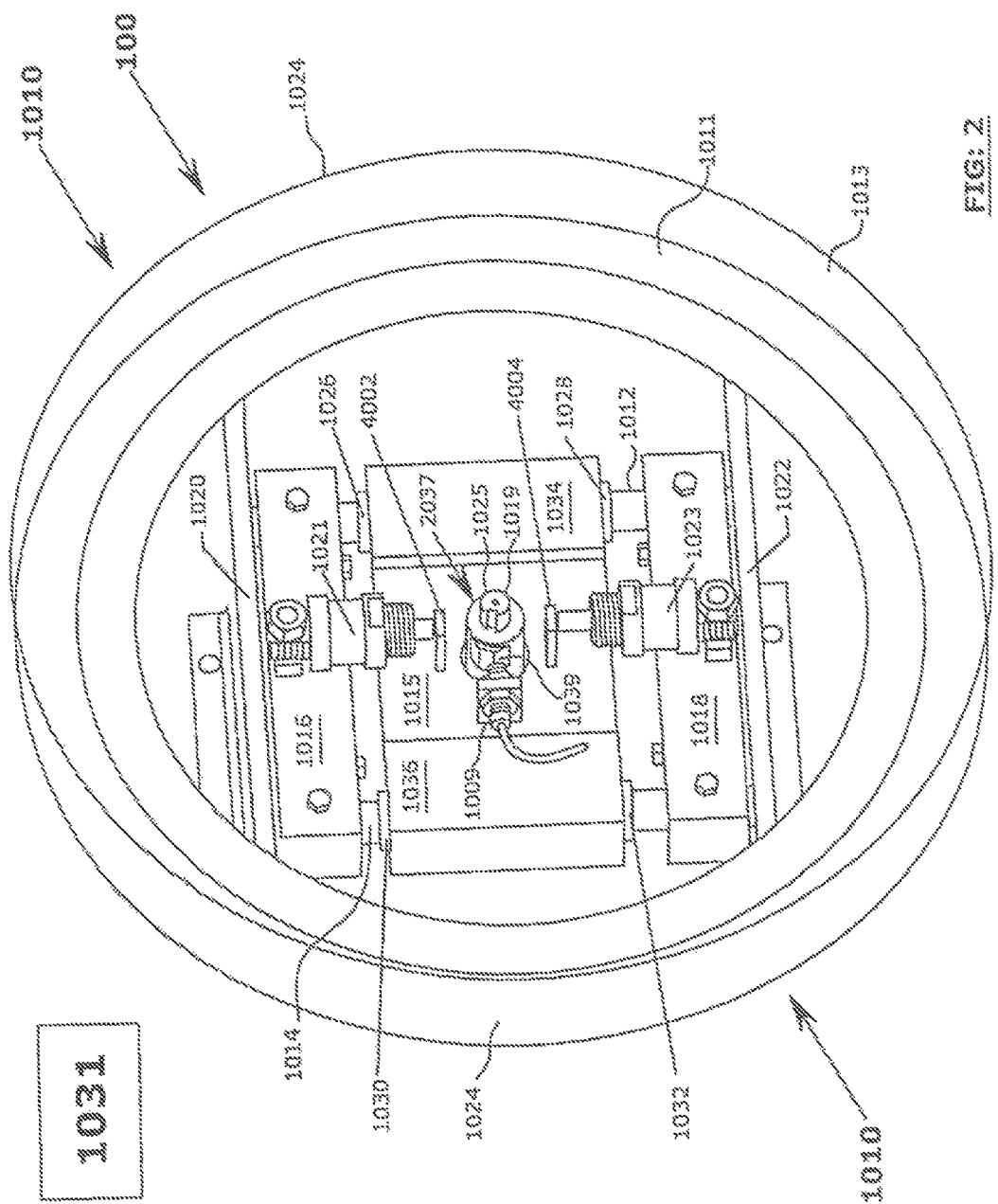
FIG. 2 is a partial perspective top view of the Force Converter Apparatus and Method machine with the linear motion, motor, sensor and force transferring mechanisms.
Figure 3:
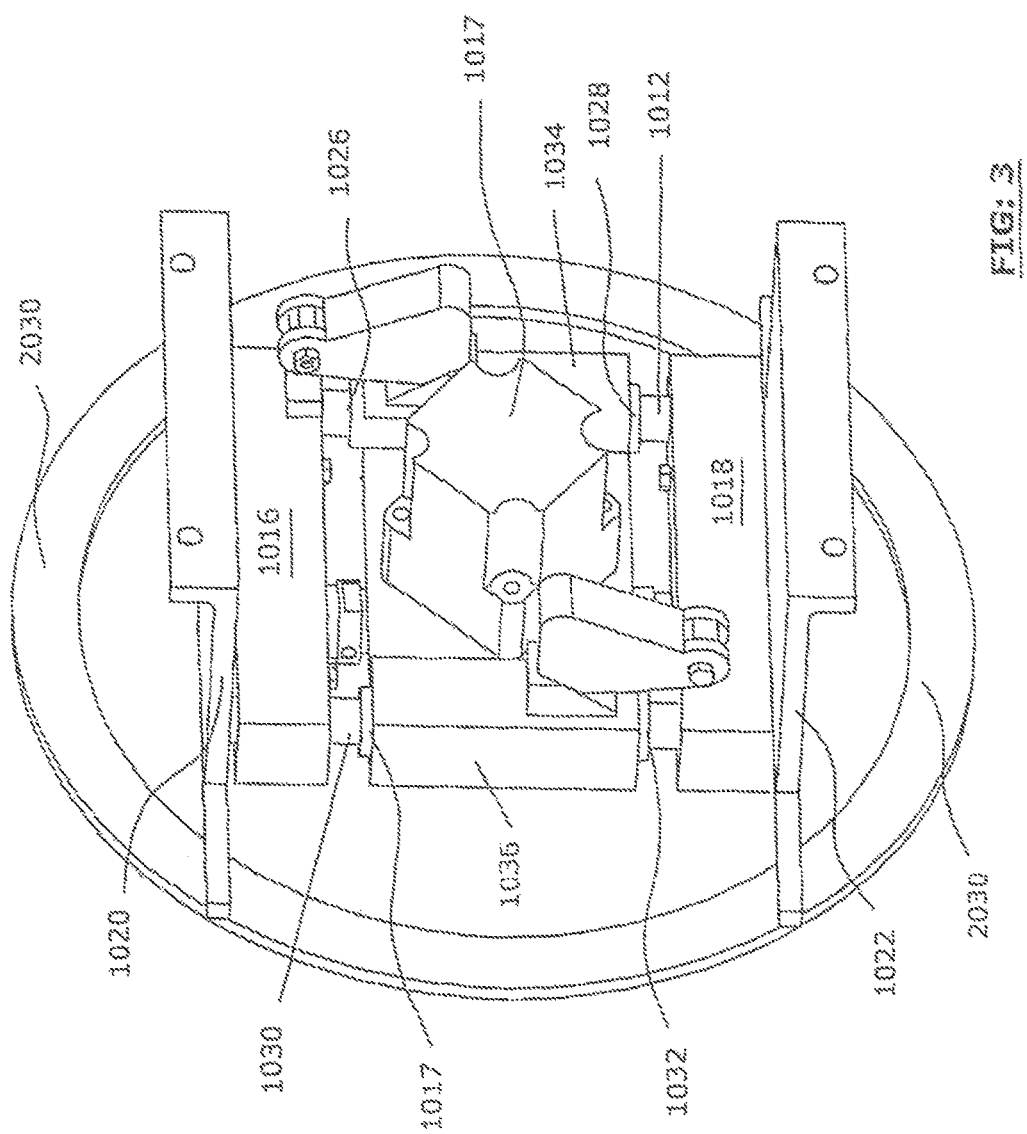
FIG. 3 is a bottom perspective view of the Force Converter Apparatus and Method machine with the linear motion, and force transferring mechanisms.
Figure 4:
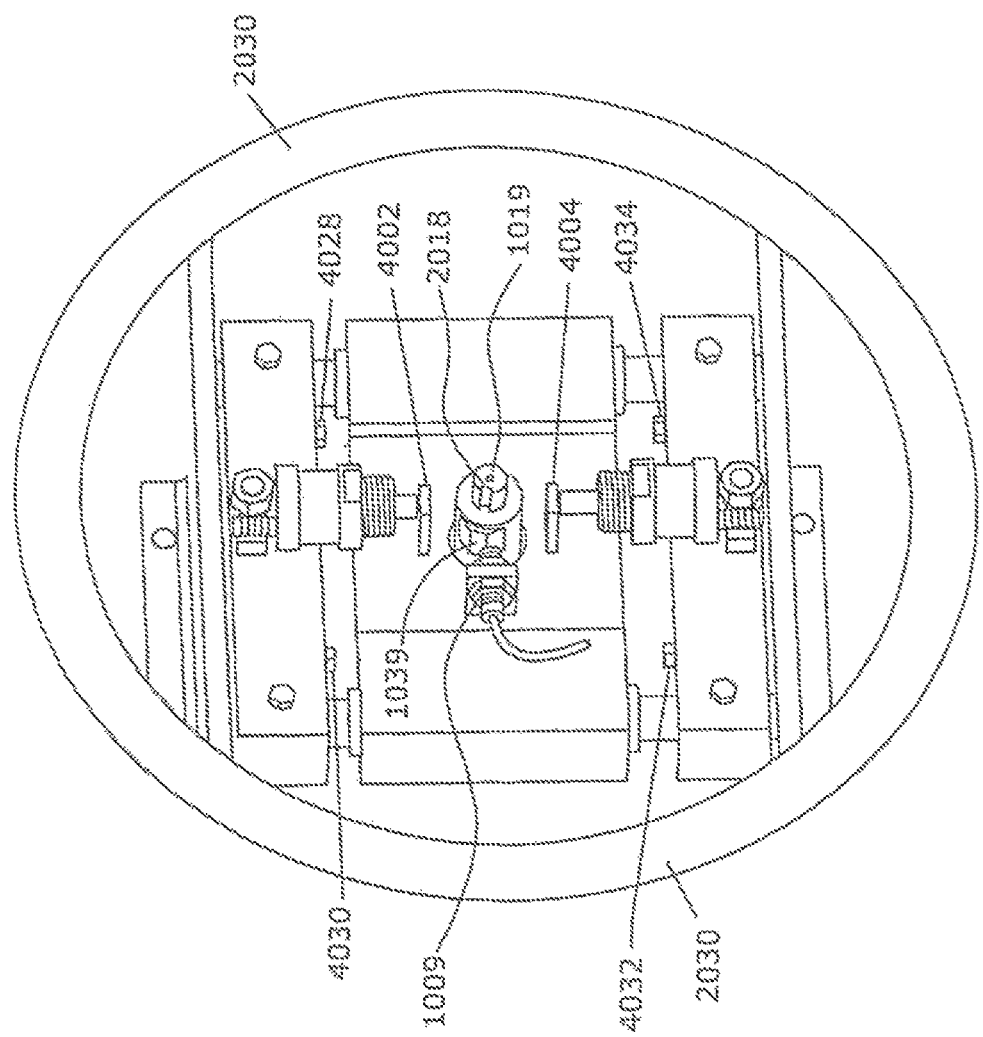
FIG. 4 is a schematic perspective top view of the Force Converter Apparatus and Method (no flexible weight mounted rotating arm is installed).

More particularly the bracket 2014 is connected to the drive shaft 1019 and locked on the drive shaft by a bolt and a key (not shown) on the keyway 2018 (see FIGS. 1, 2, and 4). One side 2025 and another side 2027 of the rotating arm 2010 are spaced from the opening of one-arm style bracket 2014 to function freely and flexibility.

Two adjustable bolts 2020, 2022 are treaded through both sides of the one-arm bracket 2014 to set the clearance between the one-arm bracket and the rotating arm 2010 to provide maximum flexible range for rotating arm 2010 to function efficiency. Cushions 2029A, 2029B which may be made from compressible plastic and the like are used to minimize the impact and friction between the rotating arm and the mounting bracket 2014 when the device 100 is starting up or shutting down.

The distal or other end of the rotating arm 2010 carries a weight 2024 which in one embodiment is a flat round weight. This weight produces the centrifugal force when the rotating arm 2010 is rotated around the motor driving shaft 1019 or rotation center or axis of rotation 1025.

A bracket 2026 is mounted underneath of the rotating arm 2010 to support the arm 2010 due to the weight 2014. A roller bearing 2028 is mounted on the bracket 2026. The roller bearing 2028 contacts a flat circular ring 2030 (see FIG. 3) to support the rotating arm 2010 and minimizes friction there between.

When force converter apparatus and method starts the roller bearing 2028 supports the rotating arm 2010 travelling on the flat circular ring 2030. Once the rotating arm 2010 reaches a desired speed, then the rotation center 1025 is freely to displace backward and forward between resting positions. When force converter apparatus is operated with mechanical clutch which will described below the rotation center is displacing with the movement of the clutch.

In the embodiment shown the intermediate position is centrally between the first and second position as well as centrally the machine 100 and platform 1015 due to the symmetrical construction of the machine 100. The platform 1015 and therefore the motor 1017 and particularly the axis of rotation 1025 is displaced or moved back and forth between a first or top position 6012, intermediate or central 6010 and second or bottom position 6014 position. The machine 100 includes linear motion displaceable means to reciprocally move and position the axis of rotation 1025 between the first, intermediate, and second position. In one embodiment the motion displaceable means includes two linear bearing housings 1034, 1036 and a central plate or platform 1015 which centrally carries the drive motor 1017. The motor 1017 drives the rotating arm 2010 in a counterclockwise direction as shown in the drawings. However, the invention described herein is operable if the arm rotates clockwise.

During operation the drive motor 1017 starts up slowly, then increases to reach the desired velocity. After the motor 1017 reaches the desired velocity is maintained at a generally constant low RPM.

Circular and Non-Circular Paths:

The force converter apparatus and method machine 100 is occasional travelling on two different orbiting paths: a circular orbiting path 5014 and a non-circular orbiting path 5016 relative the machine 100. In other words the rotating arm 2010 rotates about the fixed axis of rotation 1025, namely the motor 1017 which is fixed to the platform 1015. However, as the platform 1015 is displaced the fixed axis of rotation 1025 is displaced relative the machine 100. Generally speaking the circular orbiting path is defined where the rotating arm 2010 rotates about the axis of rotation 1025 when the rotation center is stationed at the central resting position 6010. The non-circular orbiting path 5016 is defined by multi-sections. Parts of the non-circular orbital path are where the weight 2024 at the distal end of the rotating arm 2010 rotates about the axis of rotation 1025 when the platform 1015 is moving backward and forward between resting positions 6012, 6010, 6014 and the other parts of the non-circular orbital path are where the weight at the distal end of the rotating arm rotates about the axis of rotation 1025 when the platform 1015 is stationed at the resting positions 6010, 6012, 6014. Please note that part of the non-circular orbital path 5016 is the same as the circular orbital path 5014. The non-circular orbiting path is a selected path that the rotating arm 2010 is travelling on most of the time.

During every revolution the weight 2014 at the distal end of the rotating arm 2010 is travelling on its selected non-circular orbiting path twice to allow the rotation center to be rested at the resting positions and to move the rotation center between the resting positions 6012, 6014, 6010 to transfer its centrifugal force to the output and the weight 2014 is also travelling on circular orbiting path twice when the rotation center is stationary at the machine center. The movement of the rotation center between resting positions are synchronized and harmonized with the movement of the weight through different sections on the circular and non-circular orbital path. These functions are smooth so the weight is freely travelling on and off the circular and non-circular orbital paths while its rotation center is either in the stationary states or being displaced back and forth between resting positions.

With reference to FIGS. 11 and 13 when the rotating arm 2010 is at 0 degree the axis of rotation 1025 is at the central resting position. For greater particularity 0 degree is at 12:00 o'clock, 90 degree is at 9:00 o'clock, 180 degree is at 6:00 o'clock and 270 degree is at 3:00 o'clock.

Figure 10:
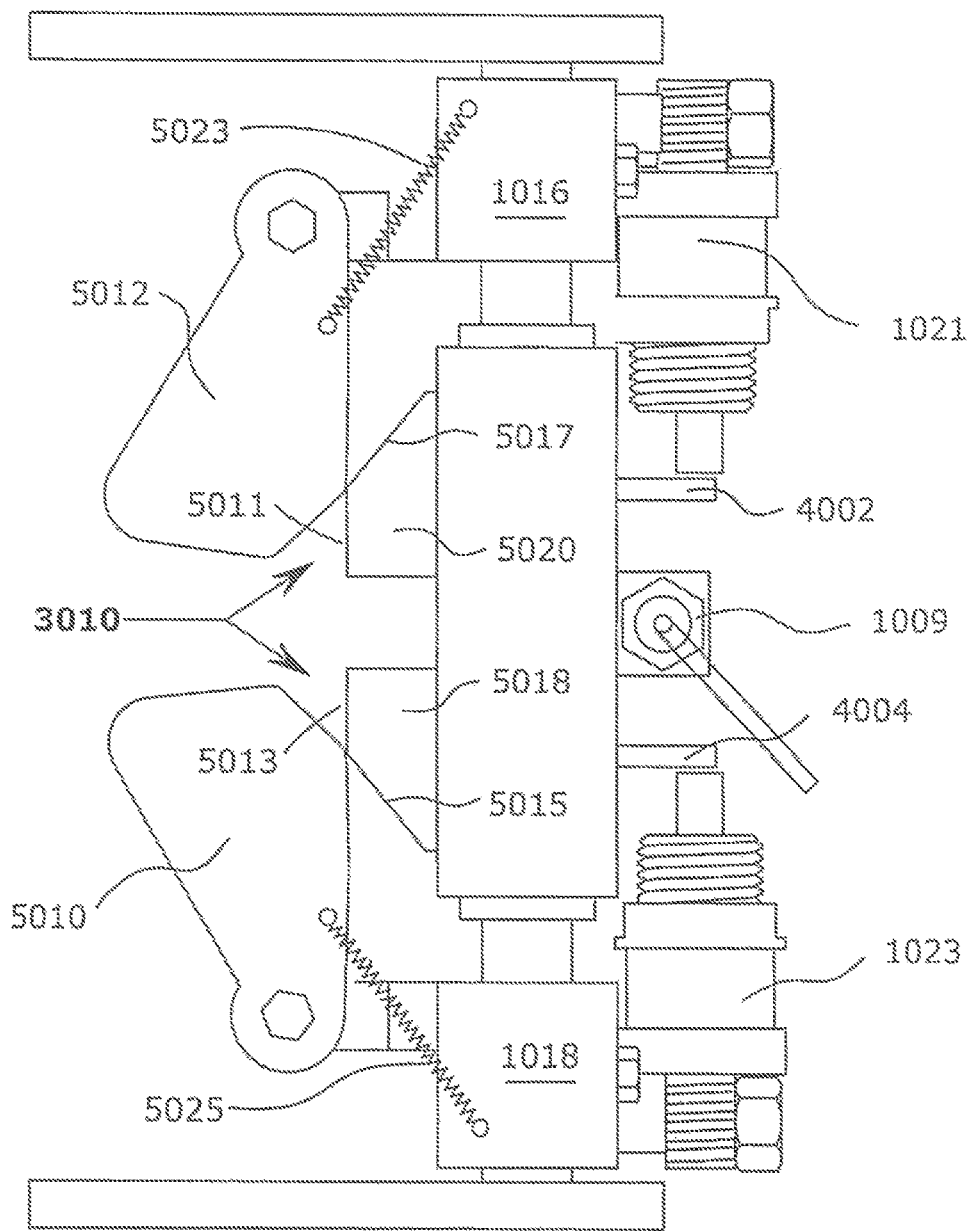
FIG. 10 is showing the side in a central resting position.

Section 1:

When the rotating arm 2010 is traveling through section 1 which is from about zero degree to about 66 degree, the first stroke of the double stroke pneumatic cylinder 1021 and the first stroke of the double stroke cylinder 1023 are maintained at the maximum extended state locking the stoppers 4002 and 4004 to the machine frame 100 to ensure that the motor rotation center 1025 is positioned and remained at the central resting position 6010 (see FIGS. 1, 2 and 10). During section one, the circular orbiting path 5014 and the non-circular orbiting path 5016 are the same (see FIG. 11). Throughout section 1 there is no centrifugal force accesses the force transferring arms 5010, 5012.

During section one the motor consumes about the same energy level as it does at other sections. In other words the energy levels that the driver motor consumed in the different sections are about the same.

Figure 5:
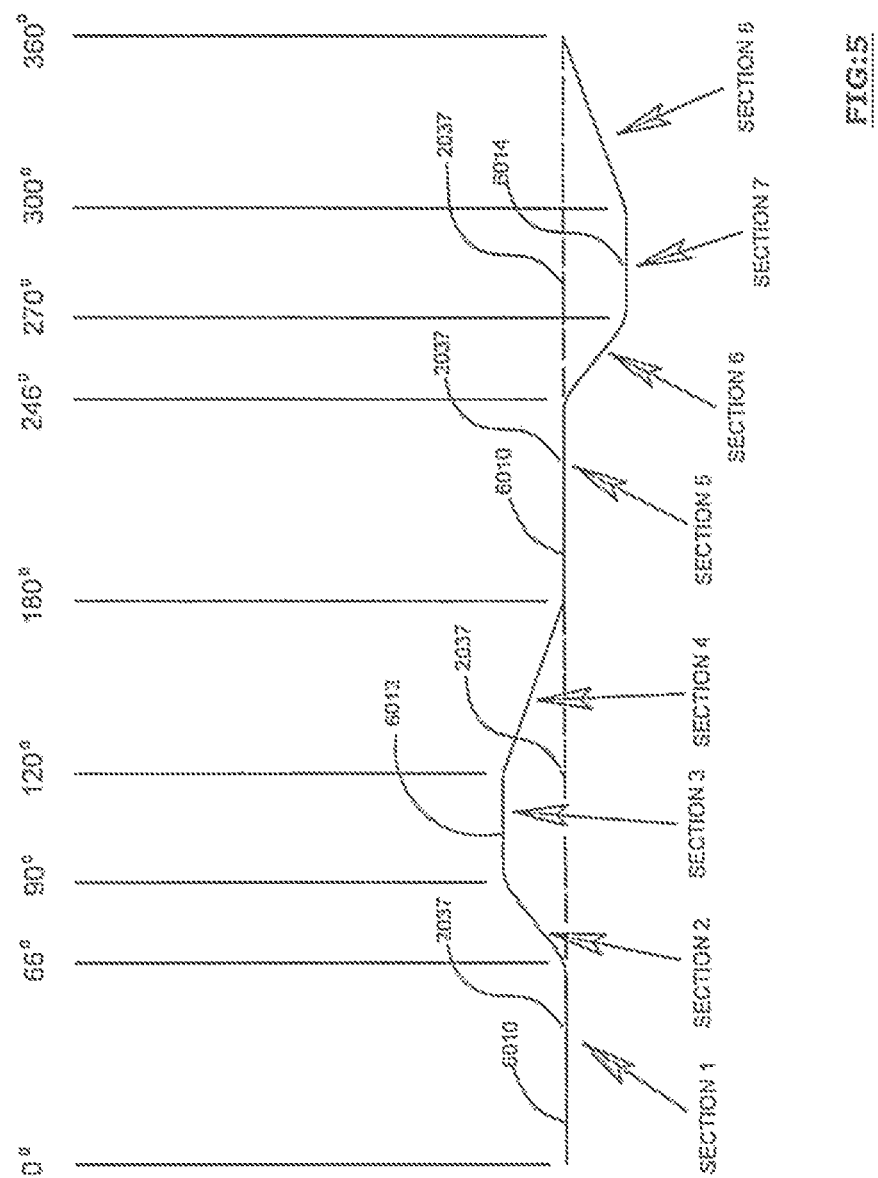
FIG. 5 is a representative view showing the functions of the rotation center throughout different sections including the force transferring sections.

Section 2:

When the rotating arm 2010 rotates through section 2 which is from about 66 degree to about 90 the weight 2024 at the distal end of the rotating arm is travelling on its selected non-circular orbiting path 5016 since the axis of rotation 1025 starts to move relative the machine 100. As seen in FIGS. 5 and 11 the rotating arm 2010 starts to get off from the circular orbiting path 5014 and starts to travel on its selected non-circular orbiting path 5016, at approximately the middle of the section 2 which is about 78 degree, non-circular orbiting path 5016 is slightly beyond circular orbiting path 5014. At this point non-circular orbiting path changes its direction inwardly to meet the circular orbiting path 5014 at about 90 degree.

More particularly during section two the 2 strokes of the double stroke pneumatic cylinder 1021 are unlocking the stopper 4002 and fully retracted, and the centrifugal force from the weight 2024 on the distal end of the rotating arm 2010 pulls the rotation center 1025 from the intermediate resting position 6010 to the first resting position 6012. The 2 adjustable stoppers 4028, 4030 are touching the center plate 1015 to support the cylinder 1021 to positioning the rotation center at the first resting position 6012. The two strokes of the double stroke pneumatic cylinder 1023 are fully extended to lock the stopper 4004 to the machine frame 100 and ensure the motor rotation center 1025 is being positioned and remained at the first resting position 6012 (see FIG. 9). The locks of the stoppers 4002 and 4004 are the same and operate much like a door latching mechanism.

As shown in FIG. 9 when the motor rotation center 1025 is travelling from the center resting position to the first resting position, force transfer arm 5012 slides downward freely on surface 5011 of force transferring shoulder 5020 and force transfer arm 5010 slides inward freely on surface 5015 of the force transferring shoulder 5018 with the assistance of springs 5023, 5025. At section 2 the centrifugal force doesn't access on the force transferring arms 5010 and 5012 until the centrifugal force exceeds the friction and the force required to displace the rotational centre 1025. Please note that, for the high power operating demand the surfaces 5015, 5017 of the force transferring shoulders 5018 and 5020 of for transferring mechanisms 3010 need to extend further to be suitable to transfer the centrifugal force from section 2 to the output when its centrifugal force exceeds the friction and the force required to displace the rotation center. Force transferring mechanisms will function almost the same way as they function at sections 4 and 8.

Section 3:

When the rotating arm 2010 is rotating through section 3 which is from about 90 degree to about 120 degree where the rotation center 1025 remains at the first resting position 6012. After passing 90 degree, non-circular orbiting path 5016 is moving inwardly to get away from the circular orbiting path 5014. The weight 2024 at the distal end of the rotating arm 2010 stops travelling inwardly at about 120 degree, then changes the direction to travel outward from 120 degree to meet the circular orbiting path at about 180 degree as shown in FIG. 11. While the rotating arm 2010 is travelling through section 3 the motor rotation center 1025 remains at the top resting position 6012. Throughout section 3 there is no force accessing the force transferring arm 5010 and 5012. The force transferring arms 5010 and 5012 remain at the same positions.

After the rotating arm passes the circular orbital path at about 90 degree the weight 2024 is continuing to travel on its selected non-circular orbiting path 5016 which is getting away from circular orbiting path 5014 so the rotating arm is creating a slanted angle. This slanted angle is getting bigger and bigger after the rotating arm passed 90 degree, so the centrifugal force is built up on the linear motion that the rotation center is positioned. During this time the two strokes of the double stroke pneumatic cylinder 1021 are maintained at the fully retracted state, the two strokes of the double stroke cylinder 1023 are maintained at the fully extended state to lock the stopper 4004 to the machine frame 100 to ensure the rotation center 1025 remains at the first resting position 6012 (see FIG. 9).

Section 4:

Before the rotating arm 2010 passes about 120 degree to travel throughout section 4 which is from about 120 degree to about 180 degree, the first stroke of the double stroke cylinder 1023 is fully retracted for unlocking the stopper 4004 and allowing the motor rotation center 1025 to travel from the first resting position 6012 to the intermediate resting position 6010. While the rotating arm 2010 is travelling throughout section 4 the centrifugal force produced by the weight 2024 on the distal end of the rotating arm 2010 pulls the motor rotation center 1025 away from the first resting position 6012 to the intermediate resting position 6010 (see FIG. 9, 10). The motor rotation center 1025 and the force transferring shoulders 5018 and 5020 are connected to the linear motion mechanism 3010. While the motor rotation center 1025 is moving from first resting position 6012 to the intermediate resting position 6010 the force transferring shoulder 5018 is also moving down, the surface 5015 of the force transferring 5018 pushes the force transferring arm 5010 away to transfer the centrifugal force from the rotating arm 2010 to the output. While the force transferring arm 5010 is pushed away to transfer the centrifugal force to the output, the force transferring arm 5012 is sliding freely on the surface 5017 of force transferring shoulder 5020 by spring 5023 (see FIG. 9).

Symmetry:

The operation of the second half of the revolution regarding the rotating arm 2010, the motion of the motor rotation center 1025, the travelling paths of the weight 2024 and other mechanisms are functioning substantially the same as the first half.

Section 5:

When the rotating arm 2010 is traveling through section 5 which is from about 180 degree to about 246 degree the circular orbiting path and non circular orbiting paths are the same. The rotation center 1025 remains at the intermediate resting position 6010. There is no centrifugal force access the force transferring mechanisms during section 5.

Section 6:

While the rotating arm 2010 is travelling though section 6 which is from about 246 degree to about 270 degree the rotation center 1025 is being pulling from the intermediate resting position 6010 to the second resting position 6014. As seen in FIGS. 5 and 11, from about 246 degree the rotating arm 2010 starts to get off from the circular orbiting path 5014 to travel on its selected non-circular orbiting path 5016. At the middle of the section 6 which is about 258 degree, the non-circular orbiting path 5016 slightly goes beyond the circular orbiting path 5014. At this point the non-circular orbiting path changes its direction inwardly to meet the circular orbiting path at about 270 degree.

More particularly during section six the two strokes of the double stroke pneumatic cylinder 1023 are fully retracted, and the centrifugal force from the weight 2024 of distal end of rotating arm 2010 pulls the rotation center 1025 from the intermediate resting position 6010 to the second resting position 6014. The two adjustable stoppers 4028, 4030 are touching the center plate 1015 to support the cylinder 1023 to positioning the rotation center at the first resting position 6014. The two strokes of the double stroke pneumatic cylinder 1021 is fully extended to lock the stopper 4002 to the machine frame 100 and ensure the motor rotation center 1025 is being positioned and remained at the second resting position 6014 (see FIGS. 5 and 8).

As shown in FIG. 8 when the motor rotation center 1025 is travelling from the intermediate resting position 6010 to the second resting position 6014, force transfer arm 5012 slides inward freely on surface 5017 of force transferring shoulder 5020 and force transfer arm 5010 slides upward freely on surface 5013 of the force transferring shoulder 5018 with the assurance of springs 5023, 5025. At section 6 there is no centrifugal force accessing on the force transferring arms 5010 and 5012 until the centrifugal force exceeds the friction and the force required to displace the rotational centre 1025. Please note that, for the high power operating demand the surfaces 5015, 5017 of the force transferring shoulders 5018 and 5020 of for transferring mechanisms 3010 need to extend further to be able to transfer the centrifugal force from section 2 to the output when its centrifugal force exceeds the friction and the force required to displace the rotation center. Force transferring mechanisms will function the same way as they function at sections 4 and 8.

Section 7:

After passing about 270 degree the flexible rotating arm 2010 is travelling on its non-circular orbiting path 5016 which is inside the circular orbiting path 5014. When the weight 2024 on the distal end of the rotating arm 2010 is traveling throughout the section 7 which is starting from about 270 degree to about 300 degree the non-circular orbiting path 5016 is slightly moving inward to go away from the circular orbiting path 5014. The weight 2024 on the rotating arm 2010 stops travelling inwardly at about 300 degree and changes its direction to travel outward from about 300 degree to meet the circular orbiting path 5014 at 360 degree (see FIG. 11). While the rotating arm 2010 is travelling throughout the section 7 the motor rotation center remains at the bottom resting position 6014. Throughout section 7 there is no force accesses the force transferring arm 5010 and 5012. The force transferring arms 5010 and 5012 remain at the same positions.

Section 8:

While the rotating arm 2010 is rotating through section 8 which is from about 300 degree to about 360 degree the rotation center is being pulling from the second resting position 6014 to the center resting position 6010 to transfer centrifugal force to the output.

More particularly before the rotating arm 2010 passes about 300 degree to travel throughout section 8, the first stroke of the double stroke cylinder 1021 is unlocking the stopper 4002 and fully retracted to allow the motor rotation center 1025 to travel from the second resting position 6014 to the intermediate resting position 6010. While the weight 2024 at the distal end of the rotating arm 2010 is travelling throughout section 8 it is travelling on the selected non-circular orbiting path 5016, the centrifugal force produced by the weight 2024 on the distal end of the rotating arm 2010 pulls the motor rotation center 1025 moving away from the second resting position 6014 to the intermediate resting position 6010.

The motor rotation center 1025 and the force transferring shoulder 5020 are connected to the linear motion mechanism 3010. While the motor rotation center 1025 is moving from second resting position 6014 to the intermediate resting position 6010 the force transferring shoulder 5020 is also moving up to push the force transferring arm 5012 away to transfer the centrifugal force from the rotating arm 2010 to the output. While the force transferring arm 5012 is being pushing away to transfer the centrifugal force to the output, the force transferring arm 5010 is sliding freely on the surface 5013 of the force transferring shoulder 5018.

As mentioned above, particularity the first section, third section, fifth section and seventh section can in an alternate embodiment collapse to essentially a point, the energy consumed is high so it is not efficient as desired.

Please note that, the centrifugal force produced by the moving weight at the end of the rotating arm is being transferred throughout the force transferring mechanisms to the output can be applied as the rotational torque or linear force which are not shown.

Circular and Non-Circular Path Distances:

As described above, the weight 2024 on the distal end of the rotating arm 2010 is occasional travelling on different circular orbiting paths to be able to transfer centrifugal force to the output while the energy consumed by the machine 100 remains substantially the same and the distance of one circular orbiting path (from 0 degree to 360 degree) and the distance of one non-circular orbiting path (from 0 degree to 360 degree) are about the same.

As outlined below when the rotating arm 2010 is travelling one revolution on the circular orbiting path while its rotation center is resting at the center of the machine and when the weight 2024 at the distal end of the rotation arm is travelling one revolution on non-circular orbiting path while its rotation center is moving backward and forward between the selected range passing the central resting position 6010 at the center of the machine, are about the same. In other words, the distance of circular orbiting path when the rotation center is stationary at the center of the machine and distance of non-circular orbiting path while its rotation center is moving backward and forward on the linear motion between positions within the selected range and when the rotation center is rested are about the same.

For example:

1.a) the circumference of the circular orbiting path of 80" diameter, or the circumference of 80" diameter (when the rotation center is stable) is 251.3274";
1.b) the non-circular orbiting path distance of 80" diameter (when the rotation center is on the linear motion moving backward and forward within 1" from the center for each side) is 250.6187". The non-circular orbiting path is 0.7087" smaller than the circular orbiting path.
2.a) the circumference of the circular orbiting path of 60" diameter, or the circumference of 60" diameter (when the rotation center is stable) is 188.4960";
2.b) the non-circular orbiting path distance of 60" diameter (when the rotation center is on the linear motion moving backward and forward within 0.7500" from the center for each side) is 187.9634". The non-circular orbiting path is 0.5326" smaller than the circular orbiting path.

Please note that the two examples mentioned above describing the circular orbiting path distance and the non-circular orbiting path distance are based on the length of the radius are shown in the examples. The dimensions may vary from the examples stated above.

The examples above show a slight difference between one circular orbital path distance and one non-circular orbital path distance. Please keep in mind that, it could be kept the same or the circular orbiting path could be slightly bigger but this would be undesirable because of it is not efficient as desired. Keeping these dimensions generally the same is straight forward; by just increasing or decreasing the angles or arc lengths of one or more sections of non-circular orbital path. As outlined earlier the angle (and thus the circumferential arc length of travel of the weight) for section one can be from zero degrees to less than about 66 degrees, and the angle and thus the arc length for section two can be from greater than zero degrees to nearly 90 degrees. The angles or the arc lengths of section five and six must be changed to correspond to the angles of section one and two so that the circular orbital paths and non circular orbital paths are symmetrical and substantially the same.

As mentioned above, the non-circular orbital path can be bigger than the circular orbital path just simply reducing the angular or the arc length of the section 3 and section 7. Section 3 can be as small as a point or it can be from about 90 degree to about less than 120 degree. Section 7 can be as small as a point or it can be from about 270 degree to about less than 300 degree. When reducing the section 3 and the section 7 to as small as a point (also reducing section one and section five as described above), the non-circular orbital path may bigger than the circular orbital path, the force converter apparatus is working well but it is not efficient.

Harmonized Motion:

While the rotating arm 2010 is travelling through section two, the rotation center 1025 is being pulling upward from the intermediate resting position 6010 to the first resting position 6012. While the rotating arm 2010 is travelling through the section six, the rotating center 1025 is being pulling from intermediate resting position 6010 to the second resting position 6014. Through section two, the rotating arm 2010 is travelling downward which is opposite the movement of the rotation center 1025 which is being pulling up; and through section 6, the rotating arm is travelling upward which is opposite the movement of the rotation center 1025 which is being pulling downward. The opposite directions of the rotating arm and the rotation center won't affect each other but they are functioning in harmony while travelling on different directions. In other words, the centrifugal force from the weight 2024 at the distal end of the rotation arm 2010 pulls the rotation center upward and downward so they are function in harmony. Furthermore the flexibility in the U-shaped bracket 1025 assists in the smooth operation.

As described above, during operation the weight at the distal end of the rotating arm, the length of the rotating arm and the speed rotating the rotating arm don't change, therefore the orbital path distance of the weight at the end of the rotating arm remained the same. It is regardless whether the weight is travelling on circular or non-circular orbital paths and while its rotation center is displaced back and forth between first and second resting positions passing the centre of the machine to transfer the powerful centrifugal force to the output or the weight is travelling on the circular orbital path when the rotation center is stationed at the center of the machine. In other words, the circumferences of the circular orbital path and non-circular orbital path are about the same regardless either the axis of the rotation is being displaced back and forth between the selected ranges or being stationary. It is observed that the motor consumes about the same energy levels while it is travelling from one section to another throughout a revolution cycle. In other words the energy consumed by the motor to rotate the rotating arm when it is transferring its centrifugal force to the output is about the same as the energy consumed by the motor when it is operated and not transferring any energy to the output. Please note that, the flywheel may be installed on the drive shaft and be rotated with the drive shaft if desired.

Output:

As described above, the weight at the distal end of the rotating arm of the force converter apparatus and method rotates on it selected non-circular orbiting path twice per revolution. During section 2 and section 6 the rotation center is displaced twice backward from the central of the machine 2037 or from the intermediate resting position 6010 to the first resting position 6012 and from central of the machine 2037 to the second resting position 6014. During section 4 and 8 the rotation center is intermittently displaced twice forward from the first and second resting positions 6012 and 6014 to the intermediate resting position 6010 at the center of the machine. The backward travelling of the rotation center occurs during movement from the intermediate resting position 6010 to the first or second resting position 6012 or 6014, which may be applied to transfer a part of the centrifugal force to the output and consumes about the same energy level as it does while the forward travelling of the rotation centre occurs during the movement from the first or second to intermediate resting position to transfer strong centrifugal force to the output. Accordingly the force converter apparatus is capable of converting a small input force or torque to a bigger output force or torque. The resulting output force can be represented by the following formula:

$$W1+W2+W3+R<W4.$$

Where W1 is the force (work) supplied to operate the drive motor; W2 is a force (work) required to rotate the rotating arm 2010 to overcome the bearing friction and air frictions; W3 is energy (work) supplied to operate the pneumatic cylinders, the sensors and the machine controller; R is the resistance or friction loss (ie energy to overcome the resistance of the moving components of the force converter apparatus and method machine); W4 is the resulting force or output force (work) from force converter apparatus and method.

According to the description above which is represent by the formula, the total energy or total force (work) that is supplied to operate force converter apparatus and method is smaller than the resultant energy or resulting output force (output work).

The observation while the force converter apparatus and method regarding the energy consumed by the motor and other factors as showed in the formula above may be seen in the example below:

1) A light duty dc low speed motor rotates a clutch reducer which is mounted on its driver shaft and the motor runs at 200 RPM, producing the torque 0.22 Newton meter or 1.95 inch pound (0.22 N·m or 1.95 in-lb), the motor consumed 14.16 watts (0.590 amp×24 volts=14.16 watts)

2) When this motor is operated exactly the same as outlined in paragraph 1 above but with a rotating arm carrying a weight connected to the motor shaft to function as the force converter apparatus and method according to the invention described. This motor is now carrying an additional load on its shaft. In other words, the motor carried a small unit of the force converter apparatus on its driver shaft, the RPM and the torque of the motor shaft remained the same, namely: 200 RPM and 0.22 newton meter or 1.95 inch pound, but the energy that the motor consumed is lower. It is showing only 12.60 watts (0.525 amp×24 volts=12.60 watts). In other words when force converter apparatus and method is connected to the driver shaft of the motor at the clutch reducer unit, the motor consumed only 12.60 watts instead of 14.16 watts the motor consumed while it is running without the force converter apparatus and method connected to the motor shaft. It is 1.56 watts lower than the motor rotates the clutch reducer directly.

3) As observed and outlined in the paragraph 2, when a single rotating arm force converter apparatus is connected to the driver shaft of the motor and runs at 200 RPM the motor consumed 14.16 watts, the RPM of the shaft is raised up to about 250 RPM while the torque remains the same which is 0.22 newton meter or 1.95 inch pound. It is approximate 25% higher than when the motor connects directly to clutch reducer. Please note that the examples observed above when a very small and preliminary prototype was used with only one unit operating at low speed, 200 RPM. The commercial force converter apparatus and method with multi-unit runs at higher speed, and the output torque will be a many times higher.

Based on the initial trial and observation the energy consumed by the motor is higher when it rotates a clutch reducer directly. In other words the force converter apparatus and method is capable of convert a small input force or torque to a larger output force or torque while maintaining a substantially constant input to output speed ratio.

Other Embodiments

Multi-units devices 100 can be assembled in series to produce higher forces or outputs. Two unit assembled machines 100 produce higher outputs.

In one embodiment the linear motions of two assembled unit machine 100 are disposed in parallel or on the same phase but their rotating arms 2010 are 180 degree out of phase. The rotating arms 2010 of such two assembled unit machine should be on the opposite direction to provide a smooth operation. Three unit assembled machine can be assembled to produce higher outputs. The linear motions of the three assembled unit machine would be 120 degree out of phase; and the rotating arms are also 120 degree out of phase. Four unit assembled machine produce even higher outputs. The linear motions of four unit assembled machines are 90 degrees out of phase. The linear motions of unit one and unit three are parallel. The linear motions of unit 2 and unit 4 are parallel. The rotating arm of unit 1 and the rotating arm of unit 3 are 180 degrees out of phase. The rotating arm of unit 2 and the rotating arm of unit 4 are 180 degrees out of phase. The four unit assembled machine is running smoother than 1, 2, 3 assembled machines. More unit machines can be connected in series to produce higher outputs. The output power can be increased by changing one, two, or changing all three factors ie the length of radius, the mass (weight) or the speed (rpm). While increasing or decreasing the length of the radius as per examples on page 19 the displacement range of the rotation center must be changed to be proportioned with the changed radius to optimize the efficiency of operation.

Furthermore the force converter apparatus and method is can be operated in a horizontal or vertical disposition. Operation in the horizontal plane is the most efficient. A balancing mechanism must be in place for the force converter apparatus and method to function efficiently while it is operating in the vertical plane.

Mechanical Clutch Replacing Pneumatic Cylinders and Sensor:

Another embodiment of the invention comprises replacing the pneumatic cylinders and sensor with a mechanical clutch, which can take many forms including a cam and the like. FIGS. 13, 14, 15 and 16 illustrate another embodiment of the invention where a mechanical clutch is used to replace the cylinders 2021 and 2023. Furthermore the electronic proximity sensor 1009 and sensor activator 1021 can be replaced by the mechanical clutch 7000. In other words the means for controlling the rotation of the arm 2010, movement and position of the axis of rotation 1025 to generate a non-circular orbital segment of the arm to transfer an output force between the first and second positions comprises a mechanical clutch 7000.

The mechanical clutch is connected to the motor shaft 1019 and rotates coaxially about axis of rotation 1025. The proximal end of arm 2010 is coaxially connected to the axis of rotation 1025 of motor shaft 1019 which is positioned below the rotating arm 2010. The mechanical clutch mechanisms mounted on the drive shaft and machine frame described above can be mounted away from the rotation center and connect to the motor shaft to provide the same function.

The stationary bearing 8000 is connected to a bracket that is attached to the machine frame 100 (not show) by a shoulder bolt 8002. The stationary bearing 8004 is connected to a bracket that is attached to the machine frame 100 (not show) by a shoulder bolt 8006.

As shown in FIG. 13, mechanical clutch 7000 has four lobes 7001, 7002, 7003 and 7004. These lobes occasionally engage the stationary bearings to place the axis of rotation 1025 in the first, second and immediate resting positions 6012, 6014, 6010 and allow the rotating arm 2010 to travel through different sections on the circular and non circular orbital paths.

When the rotating arm 2010 is rotated to about 0 degree which is pointing upward, the lobe 7001 of the clutch 7000 engages the bearing 8000 to position the rotation center 1025 at the intermediate resting position 6010 or at the center 2037 of the machine 100 (see FIG. 13), where the lobe 7002 is clear from the bearing 8004. When the rotating arm 2010 is rotating through the section one which is from about zero degree to about 66 degrees, the rotation center 1025 is rested at the intermediate resting position 6010 at the center 2037 of the machine 100, the bearing 8004 is touching the lobe 7002 to retain the rotation center at the intermediate resting position 6010 until the rotating arm 2010 is reaching about 66 degree where the lobe 7001 of the clutch 7000 is immediately clear off the bearing 8000 to allow the rotation center 1025 to move freely from the center of the machine 2037 to the first resting position 6012 while the rotating arm is rotating throughout section two which is from about 66 degrees to about 90 degrees.

When the rotating arm 2010 is rotated to about 90 degree which is pointing to the left side of the machine 100 (see FIG. 14), the lobe 7004 of the clutch 7000 engages the bearing 8000 to position the rotation center 1025 at the first resting position 6012 which is above the center 2037 of the machine 100, where the lobe 7004 is clear from the bearing 8000. While the rotation center 1025 is being rested at the first resting position 6012 the rotating arm 2010 is travelling through section three which is from about 90 degrees to about 120 degrees the bearing 8000 is touching the lobe 7003 to retain the rotation center at top resting position 6012 until the rotating arm 2010 is reaching about 120 degree the lobe 7003 of the clutch 7000 is immediately clear off the bearing 8004 to allow the rotation center 1025 displacing freely from the first resting position 6012 to the intermediate resting position 6010 while the rotating arm 2010 is rotating through section 4 which from about 120 degrees to 180 degrees.

When the rotating arm 2010 is rotated to about 180 degree which it is pointing down below the center of the machine, the lobe 7001 of the clutch 7000 engages the bearing 8004 to position the rotation center 1025 at the intermediate resting position 6010 which is at the center 2037 of the machine 100 (see FIG. 15), the lobe 7002 is clear from the bearing 8000. While the rotation center 1025 is being rested at the intermediate resting position 6010 or at the center of the machine 100 the rotating arm is travelling through section five which is from about 180 degrees to about 246 degrees the bearing 8000 is touching the lobe 7002 to retain the rotation center at central resting position 6010 until the rotating arm 2010 is reaching about 246 degree the clutch 7000 is immediately clear off the bearing 8004 to allow the rotation center displacing freely from intermediate resting position 6010 to the second resting position 6014 while the rotating arm 2010 is rotating through section six which is from about 246 degree to 270 degree.

When the rotating arm 2010 is rotated to about 270 degree which is pointing to the right side of the machine, the lobe 7004 of the clutch 7000 engages the bearing 8004 to position the rotation center 1025 at the second resting position 6014 which is below the center 2037 of the machine 100 (see FIG. 16), the lobe 7003 is clear from the bearing 8000. While the rotation center 1025 is being rested at the second resting position 6014 below the center 2037 of the machine 100 the rotation arm 2010 is travelling from about 270 degrees to about 300 degrees the bearing 8000 is touching the lobe 7003 to retain the rotation center at bottom resting position 6014 until the rotating arm 2010 is reaching about 300 degree the clutch 7000 is immediately clear off the bearing 8000 to allow the rotation center displacing freely from the second resting position 6014 to the intermediate resting position 6010 while the rotating arm 2010 is rotating through section 8 which is from about 300 degree to about 360 degree. Please note that the position of the rotating arm as it relates to the lobes of the mechanical clutch may be at the different position, in other embodiments. One mechanical clutch mechanisms as described above can be replaced by two mechanical clutch mechanisms to provide the same functions. It means that, one clutch of the two clutch mechanisms can be mounted at the top bearing 8000 position, and the other clutch can be mounted at the bottom bearing 8004 position. These two clutches are linked to the rotation center by timing belt or chain etc. The ball bearing of the two mechanical clutch mechanisms can be mounted at the mechanical clutch position 2037.

As will be apparent to those skilled in the art in light of disclosure, many other alterations and modifications are possible in the practice of this invention without departing from the spirit or scope thereof.

For example:

The pneumatic cylinders can be replaced by electrical solenoids or mechanical clutches, permanent or electromagnetic magnetic clutch and the like.

The position electronic control linear motion can replace the pneumatic cylinder and its electronic controller.

The electronic sensor can be eliminated by using a servo motor or stepper motor.

The resting positions of the force converter apparatus and method can be positioned by the servo or step motor and its driver.

The force transferring shoulder mechanisms can be replace by the jack pinion or gear system;

The linear motion can be replaced by the pendulum, pivoting livers and the like;

The motor driver of the force converter apparatus and method can be replaced by gas engines, waterfall, windmill and other natural sources.

The roller bearing and its bracket to support the rotating arm can be replaced by an inclined cable connecting from the outside end of the rotating arm to the driver shaft extended above the mounting bracket.

Force converter apparatus and method can be operated on the vertical plan instead of horizontal plan. When it is operated on the horizontal plan balancing mechanisms are required to ensure that the force converter is efficient and constantly produce the centrifugal force.

What is claimed is:

1. A device for converting an input force to an output force while maintaining a substantially constant input to output speed ratio comprising:
    (a) a frame;
    (b) a motor shaft mounted on a platform, the motor shaft rotatable about a rotation centre;
    (c) an arm having one end mounted on the motor shaft for rotation about the rotation centre, with a weight at another end of the arm that travels on and off a circular and non-circular orbital path to generate a centrifugal force;
    (d) an input force to drive the motor shaft and rotate the arm;
    (e) a force transfer arm on the frame; and
    (f) linear motion means to permit displacement of the:
        (i) platform and
        (ii) rotation centre
        relative to the frame, back and forth between first, centre and second resting positions by the centrifugal force produced by the weight;
    (g) the platform including a force transferring shoulder to displace the force transfer arm and to transfer part of the centrifugal force to the force transfer arm to produce an output force during selected movement of the rotation centre from the first resting position to the centre resting position then to the second resting position, then to the centre resting position, and then to the first resting position, repeatedly;
    (h) the linear means including cylinder means to control the motion of the rotation centre and stopper means whereby the cylinder means engages the stopper means at the first, centre and second resting positions and whereby the cylinder means disengages the stopper means during the selected movement of the rotation centre.

2. A device as claimed in claim 1 including a safety housing.

3. A device as claimed in claim 2 wherein the weight travels on the circular orbital path during a section of rotation and on the non circular orbital path during another section of rotation.

4. A device as claimed in claim 3 comprising a plurality of devices; each device including the rotatable arm travelling on different sections on the circular and non-circular orbital paths and its rotation centre being displaced at least twice backward and at least twice forward per revolution to transfer part of centrifugal force to the force transfer arm.

5. A device as claimed in claim 3 including computer means to control the rotation centre to position and displace the rotation centre during the back and forth movement between the first, centre and second resting positions to produce a non-circular orbital path and transfer part of the centrifugal force to the force transfer arm during movement of the rotation centre from one of the resting positions to another of the resting positions.

6. A device as claimed in claim 5 including a flexible mounting bracket disposed between the motor shaft and the one end of the rotating arm so that the rotating arm and weight freely travel on and off the circular orbital path and non circular orbital path throughout different sections of rotation about the rotation centre to generate the centrifugal force to displace the rotation centre back and forth between the first, centre and second resting positions.

7. A device as claimed in claim 6 wherein the linear motion means further comprises two spaced double stroke pneumatic cylinders engaging the stopper means for positioning the rotation centre in selected resting positions and for disengaging from the stopper means during the selected movement of the rotation centre.

8. A device as claimed in claim 1 wherein the rotating arm is flexible.

9. A device as claimed in claim 1 wherein the arm includes a bearing for supporting the arm.

10. A device as claimed in claim 1 wherein the arm includes a cable for supporting the arm.

11. A method of converting an input force to an output force while maintaining a substantially constant input to output speed ratio comprising:
    (a) providing an input force for rotating an arm having one end connected to a motor shaft rotatable about a rotation centre, with a weight at another end of the arm to generate a centrifugal force, the motor shaft mounted on a platform the platform including a force transferring shoulder, where the platform is movable relative a frame between a top, centre and bottom resting position with a force transferring arm on the frame, and linear motion means including cylinders and stoppers or mechanical clutch for (i) positioning the rotational centre from the top resting position, then to the centre resting position, then to the bottom resting position, and then to the centre resting position and then to the top resting positions, repeatedly and for (ii) unlocking the rotational centre with the cylinders and stoppers or mechanical clutch to allow the rotational centre to move from the top resting position, then to the centre resting position, then to the bottom resting position and then to the centre resting position and then to the top resting position, repeatedly;
    (b) mounting the stoppers on the platform;
    (c) permitting the platform and the rotational centre of the rotating arm to move within selected ranges by the centrifugal force back and forth between the top, centre and bottom resting positions to allow the force transferring shoulder to displace the force transfer arm for transferring a part of the centrifugal force to the output force when the rotation centre is moved between the top resting position, then to the centre resting position, then to the bottom resting position and then to the centre resting position and then to the first resting position, repeatedly;
    (d) whereby the cylinder engages and locks the stopper to position the rotational centre at the top, centre and bottom resting positions and whereby the cylinder disengages from the stopper so as to unlock the stopper during the selected movement of the rotation centre with the movement of the weight on the rotating arm to synchronize the movement of rotational centre; or whereby the mechanical clutch includes lobes to allow the rotational centre to move from the top resting position, then to the centre resting position, then to the bottom resting position and then to the centre resting position and then to the top resting position; repeatedly to synchronize the movement of the rotation centre and position the rotation centre at the resting positions with the movement of the weight on the rotating arm to travel on and off a circular and non-circular orbital path.

12. A method as claimed in claim 11 wherein the rotation centre is intermittently being positioned at the top, centre, and bottom resting positions and occasionally being moved between the resting positions to define non-circular orbital path and wherein the rotation centre is being positioned at the centre resting position to define circular orbital path.

13. A method as claimed in claim 12 wherein the weight on the rotating arm is travelling on its selected non-circular orbital path at least twice during the one rotation to transfer centrifugal force to the output and where the weight on the rotating arm is also travelling on a circular orbiting path at least twice during the one rotation when the rotation centre is stationary at the centre resting position.

14. A method as claimed in claim 11 wherein the weight and the rotating arm rotates through at least eight sections during one rotation revolution, the angular range of each section is variable from about zero degree to less than 120 degree.

15. The method as claimed in claim 14 wherein the first section and the fifth section can be reduced to an essential point, the second and eighth section and the fourth and eighth sections can be increased respectively so that the circular orbital path and non-circular orbital path are about the same.

16. A method as claimed in claim 11 wherein the rotating arm travels through:
   (a) a first section from greater than zero degrees to not greater than about 66 degrees and presents the circular orbital path with the rotation centre positioned at the centre resting position;
   (b) a second section from the end of the first section to nearly 90 degrees and presents the start of the non circular orbital path and the centre of rotation is displaced from the centre resting position to the top resting position where part of the centrifugal force is unleashed so as to produce the output force;
   (c) a third section from the end of the second section to about 120 degrees with the continuation of the non circular orbital path when the rotation centre remains at the top resting position;
   (d) a fourth section is from the end of the third section to greater than 180 degrees where the non circular orbital path turns its direction to travel to meet the circular orbital path and the centrifugal force pulls the rotation centre from the top resting position to the centre resting position where the centrifugal force is unleashed so as to produce the output force;
   (e) a fifth section from the end of the fourth section to not greater than about 246 degrees and presents a circular orbital path with the rotation centre positioned at the centre resting position;
   (f) a sixth section from the end of the fifth section to about 270 degrees and presents the start of another non circular orbital path and the centre of rotation is displaced from the centre resting position to the bottom resting position where part of the centrifugal force is unleashed so as to produce the output force;
   (g) a seventh section from the end of the sixth section to about 300 degrees with the continuation of the non-circular orbital path when the rotation centre remains at the bottom resting position;
   (h) an eighth section is from the end of the seventh section to the beginning of the first section where the non circular orbital path turns its direction to travel to meet the circular orbital path and the centrifugal force pulls the rotation centre from the bottom resting position to the centre position where the centrifugal force is unleashed so as to produce the output force.

17. A method as claimed in claim 16 wherein one end of the rotating arm includes a flexible connection adjacent the rotation centre.

18. A method as claimed in claim 11 wherein the rotation centre is displaced backward and forward by the centrifugal force; where in the backward movement of the rotation centre from the centre resting position to the top resting position, and from the centre resting position to the bottom resting position is synchronized with the outward movement of the weight at the distal end of the rotating arm when moving outwardly from the circular orbital path then back to meet the circular orbital path; the forward movement of the rotation centre from the top resting position to the centre resting position and from the bottom resting position to the centre resting position is synchronized with the outward movement of the weight at the distal end of the rotating arm which is from inside of the circular orbital path turning directly to meet the circular orbital path.

19. A method as claimed in claim 18 wherein:
   the centrifugal force produced by the motion of the weight starts to transfer its force to the force transferring arm to generate the output force when:
   (a) the rotation centre starts to move away from the centre resting position to the top or bottom resting position; and
   after the weight of the rotating arm passes the end of the first section or fifth section;
   (b) the rotation centre starts to move away from the top or bottom resting position to the centre resting position; and
   after the weight on the rotating arm is continuing its travel from the end of the third or seventh section to travel outwardly to meet the circular orbital path.

20. A method as claimed in claim 19 wherein the centrifugal force produced by the motion of the weight on the rotating arm stops to transfer its force to the force transferring mechanisms to generate the output force:
   (a) after the weight on the rotating arm travelling on the non-circular orbital path from outside the circular orbital path turns its direction to cross the circular orbital path;
   (b) when the rotation centre reaches the top or bottom resting positions; and
   (c) after the weight on the rotating arm travelling on the non-circular orbital path from inside the circular orbital path turns its directions to meet the circular orbital path, and
   (d) when the rotation centre reaches the centre resting position.

* * * * *